(12) United States Patent
Jacobsen

(10) Patent No.: US 7,286,481 B2
(45) Date of Patent: Oct. 23, 2007

(54) WIRELESS NETWORK ADAPTED TO TRANSMIT CHANNEL SIDE INFORMATION AND METHOD THEREOF

(75) Inventor: Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 10/322,291

(22) Filed: Dec. 17, 2002

(65) Prior Publication Data
US 2004/0114560 A1 Jun. 17, 2004

(51) Int. Cl.
H04B 1/56 (2006.01)

(52) U.S. Cl. .................. 370/248; 370/252; 370/338; 370/349; 375/148; 375/231; 375/346

(58) Field of Classification Search ............. 370/328, 370/347, 509, 241, 248, 252, 338, 349; 455/70, 455/88; 375/148, 224, 231, 316, 346
See application file for complete search history.

(56) References Cited

U.S. PATENT DOCUMENTS

| | | | |
|---|---|---|---|
| 5,533,013 A | | 7/1996 | Leppanen |
| 5,619,524 A | * | 4/1997 | Ling et al. .................. 375/130 |
| 5,767,738 A | * | 6/1998 | Brown et al. ............... 329/304 |
| 5,852,630 A | * | 12/1998 | Langberg et al. ........... 375/219 |
| 6,038,223 A | * | 3/2000 | Hansson et al. ............ 370/329 |
| 6,150,955 A | | 11/2000 | Hinze et al. |
| 6,373,433 B1 | * | 4/2002 | Espax et al. ................ 342/368 |
| 6,400,783 B1 | * | 6/2002 | Cusani ....................... 375/354 |
| 6,678,338 B1 | * | 1/2004 | Noguet et al. .............. 375/330 |
| 6,680,967 B1 | * | 1/2004 | Westman ..................... 375/148 |
| 6,775,332 B1 | * | 8/2004 | Li et al. ..................... 375/316 |
| 6,912,249 B2 | * | 6/2005 | Haartsen ..................... 375/231 |
| 6,985,752 B2 | * | 1/2006 | Takano et al. .............. 455/522 |
| 6,987,738 B2 | * | 1/2006 | Subramanian et al. ...... 370/252 |
| 2002/0071407 A1 | | 6/2002 | Koo et al. |
| 2002/0177432 A1 | * | 11/2002 | Casaccia et al. ............ 455/410 |

FOREIGN PATENT DOCUMENTS

| | | |
|---|---|---|
| WO | WO 98/52325 | 11/1998 |
| WO | WO 98/52326 | 11/1998 |
| WO | WO 99/41918 | 8/1999 |
| WO | WO 02/33841 | 4/2002 |
| WO | WO 02/052771 | 7/2002 |

OTHER PUBLICATIONS

Bo et al—A novel transmission coordination scheme for single hop lightwave networks—Global Telecommunications conference Nov. 13, 1995.
Khanduri et al—Avoidance of double encoding and decoding in digital ceelular network—Personal Wireless Communications—Feb. 19, 1996.

* cited by examiner

Primary Examiner—Hassan Kizou
Assistant Examiner—Brian T O'Connor
(74) Attorney, Agent, or Firm—Schwabe, Williamson & Wyatt, P.C.

(57) ABSTRACT

Briefly, in accordance with one embodiment of the invention, a wireless network may include transmitters that may transmit information over a channel. the transmitter may also transmit channel side information over the channel. Further, the transmitters may adjust when channel side information is transmitted in accordance with the channel coherence time.

35 Claims, 5 Drawing Sheets

WIRELESS NETWORK ADAPTED TO TRANSMIT CHANNEL SIDE INFORMATION AND METHOD THEREOF

BACKGROUND

Wireless networks typically transmit information in packets. The packets may be transmitted from the transmitter of one terminal (e.g. an access point) to the receiver of another terminal (e.g. a mobile computer) across a channel. If the packet is received properly, an acknowledgement message may be sent from the receiving terminal to the transmitting terminal. However, waiting for and transmitting acknowledgment messages may adversely affect the overall throughput of information across the network.

Thus, there is a continuing need for better ways to transmit packets across a wireless network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Orthogonal frequency division multiplexing (OFDM) is a multi-carrier transmission technique that may use orthogonal subcarriers to transmit information within an available spectrum. The subcarriers may be orthogonal to one another, and thus, may be spaced more closely together within the available spectrum than, for example, the individual channels in a conventional frequency division multiplexing (FDM) system. An OFDM system may provide orthogonality by using subcarriers that have a null at the center frequency of the other subcarriers. The orthogonality of the subcarriers may help reduce inter-subcarrier interference within the system.

One problem with conventional OFDM systems is that it may be difficult to make optimal use of the channel due to in-band interference and channel effects (e.g., multipath reflections, frequency selective fading, interference). These dynamically changing channel characteristics, for example, may reduce the number of bits per symbol that can be effectively communicated (i.e. may affect bit error rate, signal to noise ratio, packet error rate, etc.).

Figure 1:
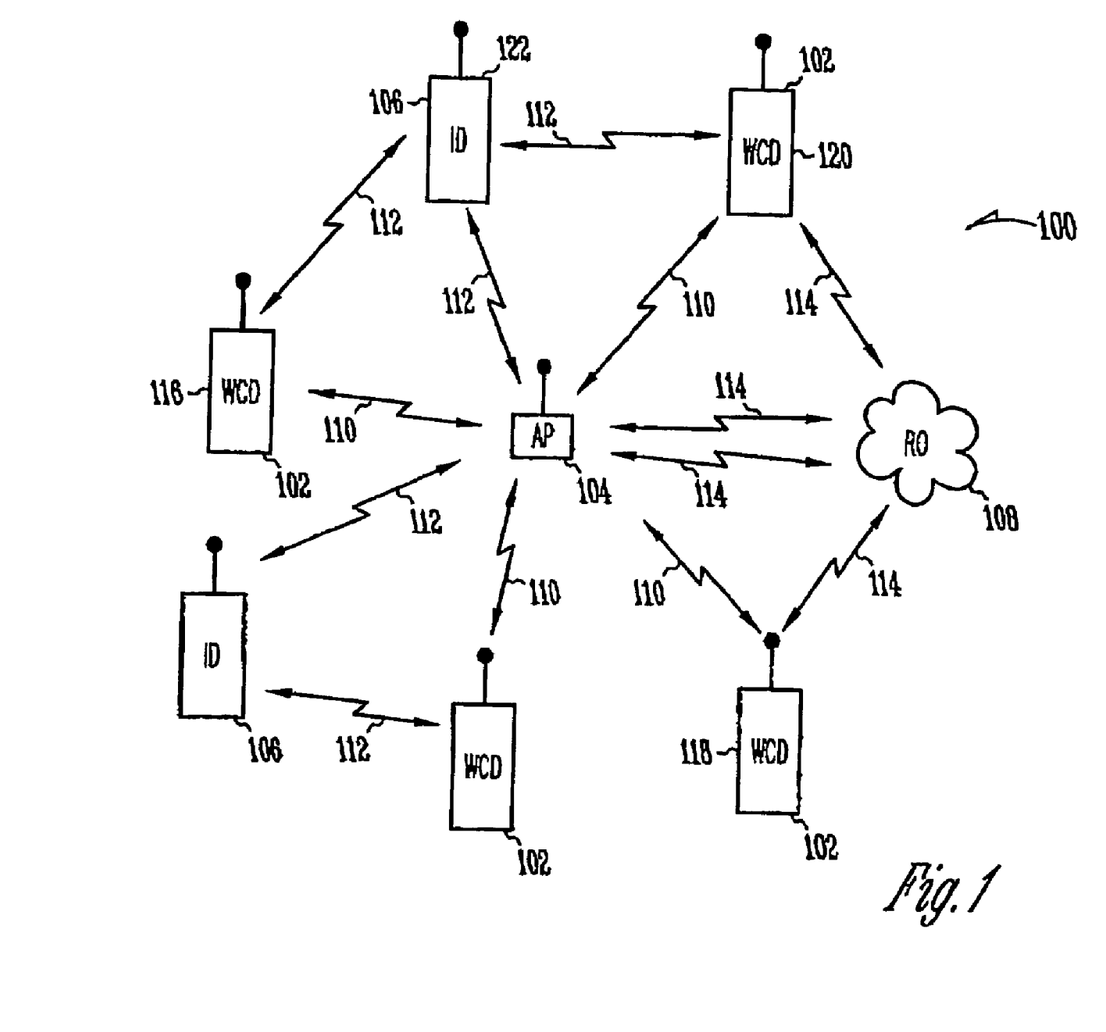
FIG. 1 is a wireless communication environment illustrating the operation of an embodiment of the present invention.

FIG. 1 is a wireless communication network 100 in accordance with an embodiment of the present invention. Communication network 100 here includes one or more terminals such as wireless communication devices (WCD) 102 which may communicate with other terminals (e.g. an access point (AP) 104) via communication with bi-directional OFDM channels 110. Terminals 102 may represent, for example, any combination of personal digital assistants (PDAs), laptop and portable computers with wireless communication capability, web tablets, wireless telephones, wireless headsets, pagers, instant messaging devices, MP3 players, digital cameras, and other devices that may receive and/or transmit information wirelessly. Simply stated, a terminal in accordance with embodiments of the present invention may include any device that may transmit packets to or receive packets from network 100 and may include devices that have any combination of wireless or wired communication access.

Although the scope of the present invention is not limited in this respect, WCDs 102 may communicate with AP 104 using one or more different communication techniques. For example, a multi-carrier transmission technique, such as an orthogonal frequency division multiplexing (OFDM) technique that uses orthogonal subcarriers to transmit information within an assigned spectrum. Alternatively, the terminals of network 100 may employ time division multiplexed (TDM) transmission, frequency division multiplexed (FDM) transmission, and the like, or any combination or variation thereof.

For the particular embodiment shown in FIG. 1, the term downstream is used to designate communications in the direction from AP 104 to WCDs 102 while the term upstream is used to designate communications in the direction from WCDs 102 to AP 104. It should be understood that this is meant to be illustrative and that the scope of the present invention is not limited to this particular naming convention. Accordingly, WCDs 102 may support duplex communications utilizing different spectrum for upstream and downstream communications, although this is not a requirement. In one embodiment, upstream and downstream communications may share the same spectrum for communicating in both the upstream and downstream directions. Although FIG. 1 illustrates point-to-multipoint communications, embodiments of the present invention are suitable to both point-to-multipoint and point-to-point communications.

In addition, embodiments of the present invention may have application to many types of networks. For example, embodiments of the present invention may have application in ad-hoc networks, fixed networks, peer-to-peer networks, Personal Area Networks, Mobile Networks, Wireless Local Area Networks, Wireless Metropolitan Area Networks, Satellite Networks, Mobile Networks, Wireless Industrial Networks, Wireless Sensor Networks, and the like In addition to facilitating communications between WCDs 102, in an alternative embodiment AP 104 may be coupled with one or more networks, such as an intranet or the Internet, allowing WCDs 102 to access and exchange information with such networks.

Further, although the scope of the present invention is not limited in this respect, network 100 may employ one or more communication protocols and it is not limited to any particular protocol or family of protocols. For example, embodiments of the present invention may have application in wireless local area network protocols, such as, for example the Institute of Electronics and Electrical Engineers (IEEE) 802.11 specification, fixed wireless protocols such as, for example the IEEE 802.16 specification, personal area networks such as, for example, the IEEE 802.15 specification, the Digital Video Broadcasting Terrestrial (DVB-T) broadcasting standard, the High performance radio Local Area Network (HiperLAN) standard, and the like.

As shown in FIG. 1, Communication environment 100 may also include one or more reflecting objects (RO) 108 which may cause multipath reflections and frequency selective fading within the spectrum utilized by AP 104 and WCDs 102. Communication environment 100 may also include one or more in-band interfering devices (ID) 106 which generate interference within the spectrum utilized by AP 104 and WCDs 102. Due to reflecting objects 108 and interfering devices 106, WCD 102 and AP 104 may experience channel fading, multipath components, and interference conditions unique to the particular WCD. This, in turn, may affect the overall quality and capacity of the channel(s) between WCD's 102 and AP 104.

As explained in more detail below, WCDs 102 and AP 104 may adapt to the local channel conditions to achieve improved communication rates. For example, WCD 116 may compensate, at least in part, for in-band interference caused by interfering devices 106 to achieve an improved communication rate. WCD 118, for example, may compensate, at least in part, for multipath components caused by reflecting object 108 to achieve an improved communication rate. WCD 120, for example, may compensate, at least in part, for multipath components caused by reflecting object 108 and for in-band interference caused by interfering device 122 to achieve an improved communication rate. AP 104, for example, may adapt its communications with WCDs 102 to compensate for the conditions unique to the particular WCD to achieve an improved communication rate with WCDs 102.

In accordance with one embodiment, background noise, in-band interference and channel effects may be measured for portions of the assigned spectrum and a modulation order is selected on a per subcarrier basis to compensate for channel effects and in-band interference. For example, although the scope of the present invention is not limited in this respect, a receiver or transceiver in the nodes within network 100 may periodically generate a channel estimate. The channel estimate may include an approximation of noise, environmental conditions, interference, etc. that may exist in the channel so that their effects may be adjusted for, if desired. Accordingly, the subcarriers may operate at different communication rates allowing the channel to approach its "water-filling capacity".

In another embodiment, AP 104 may select modulation orders on a per subcarrier basis for upstream communications received from WCDs 102. In yet another embodiment, WCDs 102 may select modulation orders on a per subcarrier basis for downstream communications received from AP 104. Although the scope of the present invention is not limited in this respect, the selection of modulation orders may be performed as often as the channel conditions change, depending on the coherence time of the channel. The channel conditions may be continually or periodically monitored and modulation orders may be selected when channel conditions change. Modulation orders may also be selected on a regular basis that may be less than the channel's coherence time.

Although the scope of the present invention is not limited in this respect, modulation orders may be selected based on information associated with the channel estimate such as, for example, a signal to interference and noise ratio (SINR). Thus, higher modulation orders may be selected for subcarriers having better SINRs. Simply stated, modulation order or orders may define a number of bits per symbol that may be communicated using a particular subcarrier.

Modulation orders may include binary phase shift keying (BPSK) that communicates one bit per symbol, quadrature phase shift keying (QPSK) that communicates two bits per symbol, 8PSK that communicates three bits per symbol, 16-quadrature amplitude modulation (16-QAM) that communicates four bits per symbol, 32-QAM that communicates five bits per symbol, and 64-QAM that communicates six bits per symbol. Modulation orders may also optionally include differentially coded star QAM (DSQAM). Modulation orders with lower and even higher communication rates per subcarrier may also be selected.

Alternatively or optionally, adverse channel characteristics may be addressed by adjusting forward error correction (FEC) code rates based on the per subcarrier modulation selections or the SNR or SINR. In another embodiment, the FEC code rates may be adjusted and applied to all subcarriers in a group of OFDM symbols. The FEC code rate may be adapted, for example, by puncturing, shortening or selectively erasing the code. In accordance with yet another embodiment, an interleaving scheme may also be adjusted based on the per subcarrier modulation selections to match OFDM symbol boundaries. In another embodiment, the interleaving scheme may be adjusted and applied to all subcarriers in a group of OFDM symbols.

Figure 2:
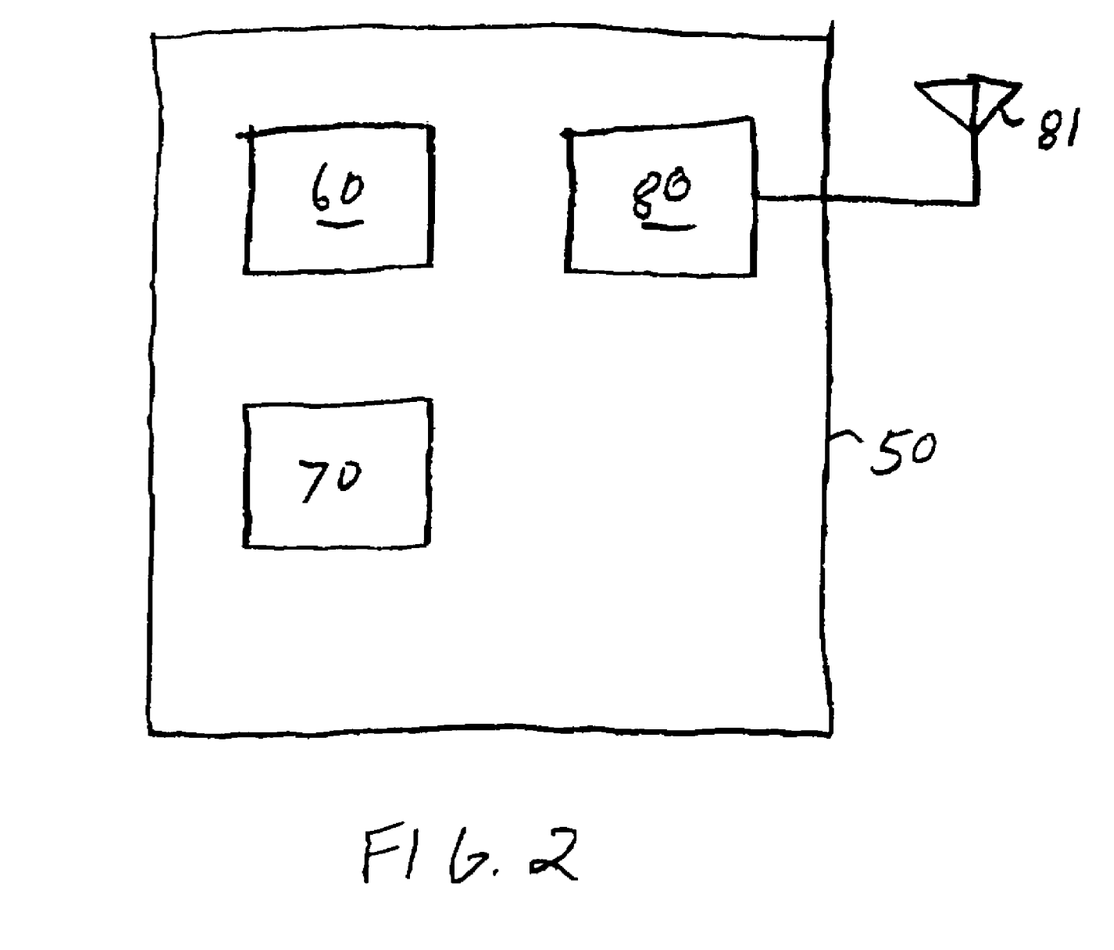
FIG. 2 is a highly simplified functional block diagram of a wireless communication device in accordance with an embodiment of the present invention.

FIG. 2 is a highly simplified functional block diagram of a wireless communication device 50 in accordance with an embodiment of the present invention. The following discussion of device 50 may be applicable for use as WCD 102 or access point 104 (see FIG. 1), or any other type of terminal such as any of the types of terminals described above.

Wireless device 50 here may include a processor 60, for example, a microprocessor, a central processing unit (CPU), a digital signal processor, a microcontroller, a reduced instruction set computer (RISC), a complex instruction set computer (CISC), or the like. During the operation of wireless device 50, processor 60 may either store data in or execute instructions from a memory 70 (e.g. RAM, non-volatile memory, or any of the other memory types described above).

Although the scope of the present invention is not limited in this respect, memory 70 may also be used to store information associated with a communication channel such as, for example, channel estimate data, channel characteristics, modulation order, FEC data, etc. Wireless device 50 may also include a transceiver 80 that uses an antenna 81 to provide wireless communication to a network (i.e. network 100 of FIG. 1). It should also be understood that in alternative embodiments, device 50 may have separate transmitters and receivers that may or may not share hardware components.

Figure 3:
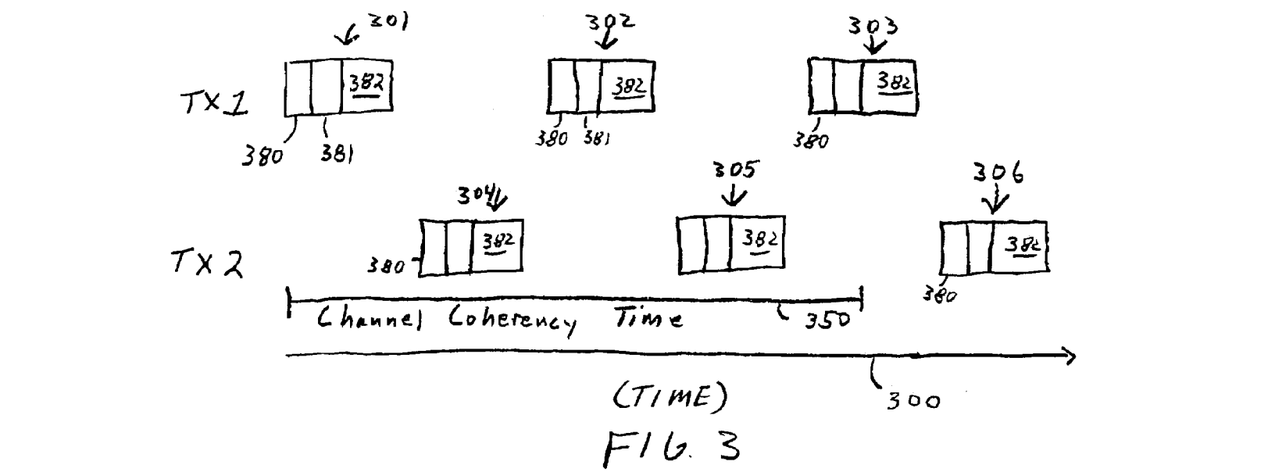
FIGS. 3-4 are simplified timing diagram suitable for use by terminals in a network in accordance with an embodiment of the present invention.

Turning to FIG. 3, a method for transmitting packets by accounting for channel characteristics is provided. FIG. 3 illustrates how packets of data 301-306 may be exchanged or transmitted across a channel (i.e. between TX1 and TX2) over time; represented by an axis 300. Simply stated, although the scope of the present invention is not limited in this respect, the terminals that are communicating wirelessly may transmit to each other information regarding the channel. This information may be used by the receiving terminal so that it may make appropriate changes to compensate for channel effects.

For example, in one embodiment, the receiver of TX1 (e.g. a transceiver 80 of wireless device 50) may measure background noise, in-band interference and/or channel effects for portions of the spectrum used to communication with TX2. IN addition, or alternatively, the receiver may generate a channel estimate for the channel between TX1 and TX2. The channel characteristic information or the channel estimate made be generated during a period of time that neither TX1 nor TX2 are transmitting. Alternatively, TX1 may generate the information when TX2 is transmitted a predetermined signal or preamble.

TX1 may then transmit a packet 301 to TX2. Although the scope of the present invention is not limited in this respect, packet 301 may include a preamble 380, channel side information 381, and data 382. Preamble 380 may include predetermined information that may be used by TX2 to synchronize the communication and/or generate its own channel estimate based on how it received the information in preamble 380. If the contents of preamble 381 are known, then TX2 may be able to measure the effects of noise, interference or multi-paths on the channel.

Packet 301 may also include channel side information 381 that may be used to allow TX1 and TX2 to dynamically alter their transmission characteristics to adapt to the current channel characteristics. Although the scope of the present invention is not limited in this respect, the channel side information transmitted by TX1 may comprise instructions or information that TX2 may use to modify how it transmits future packets. For example, channel side information may direct TX2 as to what modulation order it should use, what delay time, if any, should be used when transmitting. In addition, or alternatively, channel side information 381 may also comprise all or a portion of the channel estimate data generated by TX1.

In yet other embodiments, channel side information may include information about past transmissions such as, for example, transmission success rates, bit error rates, packet error rates, error corrections codes, interleaving information, etc. It should be understood that the types or nature of the channel side information is not limited to these particular examples. In other embodiments, channel side information 381 may include any information used by TX2 to dynamically adapt its operation so as to compensate for the characteristics of the channel between TX1 and TX2.

Packet 301 may also include cargo or data 382 that may comprise any information being sent from TX1 to TX2. Although the scope of the present invention is not limited as to the particular amount or type of data transmitted in packet 301, data 382 may include user data such as, for example, video data, application data, voice data, file data, etc. or data associated with the operation of the wireless network (e.g. network 100 of FIG. 1).

After TX1 transmits packet 301, TX2 may prepare and transmit a packet 304. Upon receipt of packet 301, TX2 may make the appropriate changes to reflect the information contained in channel side information 381 of packet 301. For example, TX2 may alter its modulation order (e.g. higher or lower), increase or decrease its delay time(s), or may sample/review the channel estimate data provided by TX1.

After making the appropriate changes, if needed, TX2 may then prepare a packet 304 to be transmitted to TX2. Packet 304 may also comprise preamble data 380, channel side information 381, and data 382. The preamble data 380 may be used by TX1 to assess the current channel characteristics, and channel side information 381 may comprise instructions or information that may alter the future transmissions made by TX1. Preamble 380 may also comprise addressing or other header information indicating the desired destination for packet 304, the type of data contained within the packet, encryption information, etc, although the scope of the present invention is not limited by the particular nature or content of preamble 380. Packet 304 may also comprise data 382 to be transmitted from TX2 to TX1.

As shown in FIG. 3, TX1 and TX2 may continue to alternate the transmission of packets 302-303 and 305-306. In this particular embodiment, packets 301-306 may each comprise channel side information 381. This may allow TX1 and TX2 to alter it operational characteristics upon receipt of each packet 301-306. However, it should be understood that the scope of the present invention is not limited in this respect as will be explained with reference to FIG. 4.

It should also be understood that the scope of the present invention is not limited to particular spatial timing shown in FIG. 3. In alternative embodiments, the transmission of packet 304 may overlap with the transmission of packet 301. Alternatively, the amount of delay between the end of packet 301 and beginning the transmission of packet 304 may be varied.

Figure 4:
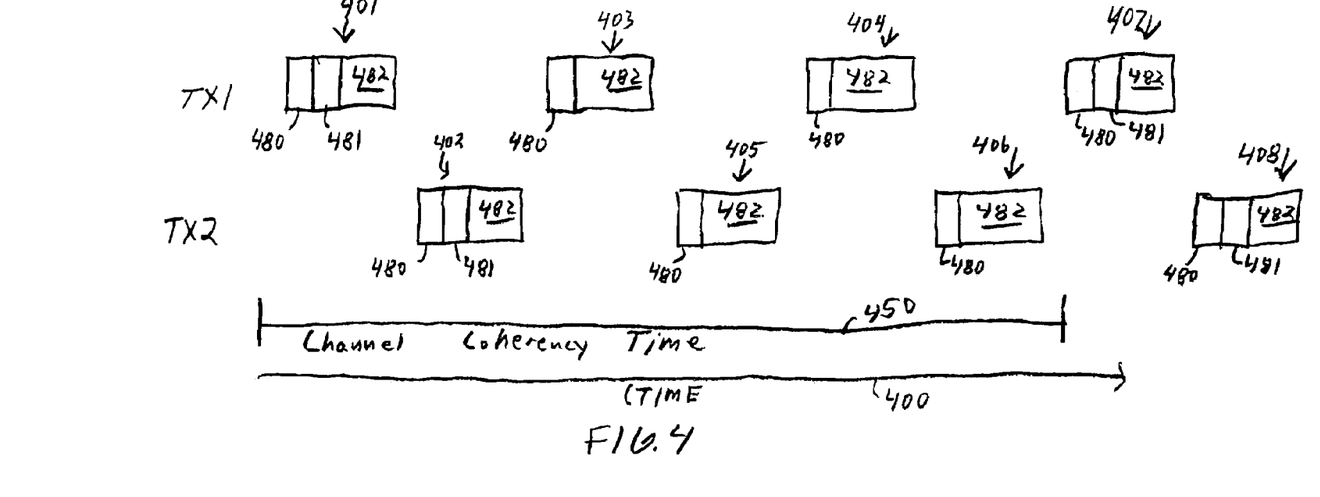
Figure 5:
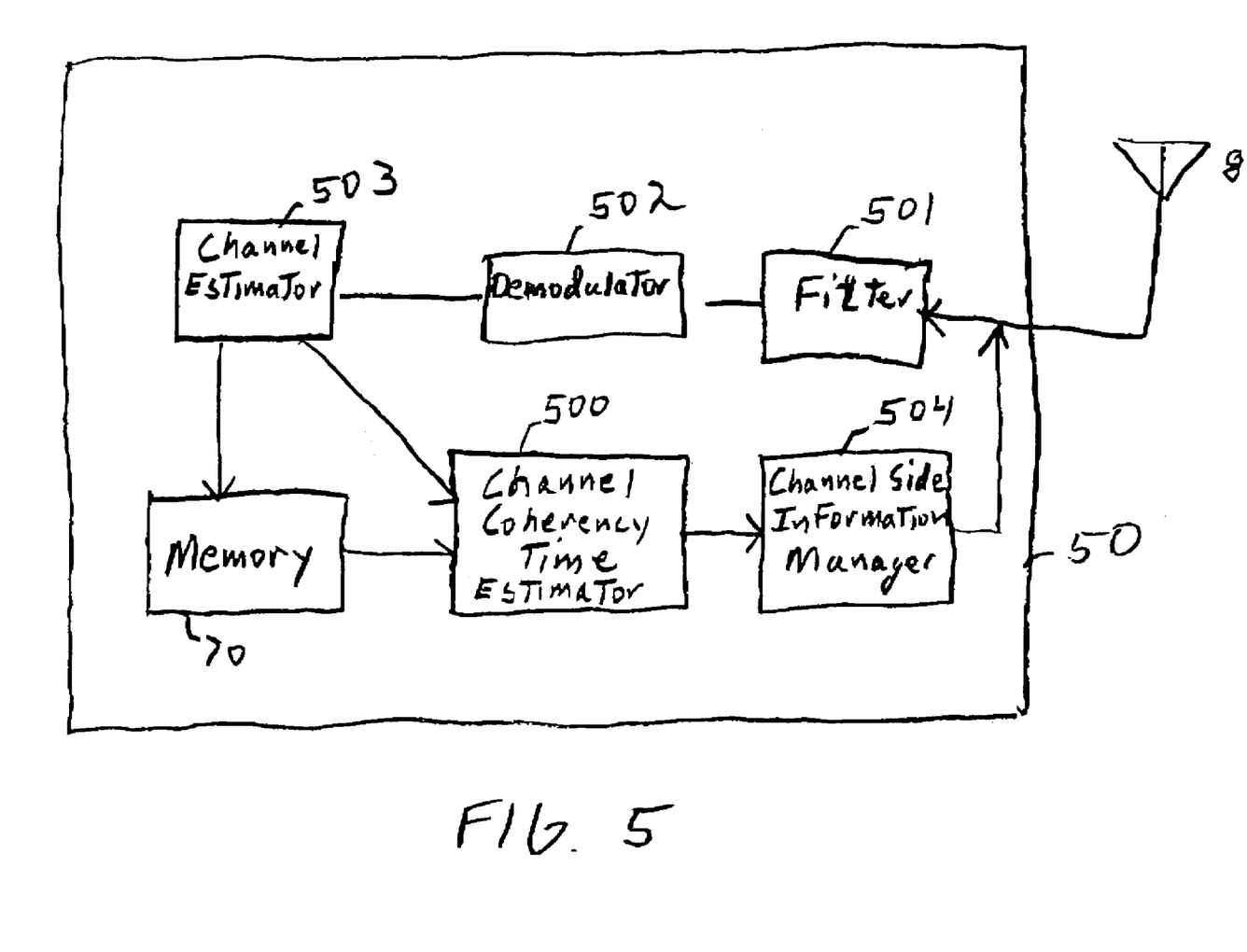
FIG. 5 is a highly simplified functional block diagram of a wireless communication device in accordance with another embodiment of the present invention.

Turning to FIGS. 4-5, a method of transmitting packets of data between TX1 and TX2 in accordance with an alternative embodiment is provided. FIG. 5 is a more detailed block diagram of a portion of wireless device 50. In addition to memory 70, wireless device 50 may include a filter module 501, a demodulator module 502, a channel estimator module 503, a channel coherency time estimator 500, and a channel side information manager 504. However, it should be understood that the scope of the present invention is not limited to just embodiments that have all these modules arranged in the manner shown in FIG. 5. In addition, any combination of modules 501-503, channel coherency time estimator 500, and channel side information manager 504 may be part of or external to transceiver 80 (see FIG. 2).

In this particular embodiment the channel may be sampled with antenna 81. The signal(s) may be filtered and/or amplified by filter module 501 and then demodulated with demodulator 502. It should be understood that the scope of the present invention is not limited to the particular arrangement of modules 501 or 502 as these may vary, as desired, depending, at least in part, upon the particular communication protocol employed by wireless device 50.

A channel estimate may then be generated by channel estimator 503 to approximate the current characteristics of the channel. For example, channel characteristics such as fading, multi-paths, frequency selectivity, etc., may be measured using the signals received from cooperating devices. Channel characteristics such as noise and interference may be measured during a period when communication devices in the network refrain from transmitting (e.g., during a pre-designated dead time). It should be understood that the scope of the present invention is not limited by the content or technique used to generate the channel estimate.

The channel estimate information may then optionally be stored in memory such as, for example, in memory 70. A channel coherence time estimator 500 may then calculate or determine a predicted channel coherence time for the channel between TX1 and TX2. Although the scope of the present invention is not limited in this respect, the channel coherence time may represent the period of time during which it is expected or predicted that there will not be any substantial change in characteristics of the channel between two terminals (indicated in FIG. 4 within bracket 450). For example, the channel coherence time 450 may represent the period of time during which is it expected there will not be enough of a change in the noise, interference, multi-paths, etc. of the channel to warrant a change in the transmission characteristics of the transmitter used to transmit a data packet.

Although the scope of the present invention is not limited in this respect, the channel coherence time 450 may be calculated or determined by comparing the current or most recent channel estimate data to recent or historical channel estimate data. By observing the degree of changes in the channel characteristics, it may be possible to predict or determine how long the current operation of the transmitters may remain the same and still successfully transmit packets across the channel.

Alternatively or additionally, channel coherence time estimator 500 may monitor and use one or more factors to determine how long before there is an appreciable change in the channel characteristics to prompt a change in the operation of TX1 and/or TX2. For example, estimator 500 may monitor the trend in factors such as, but not limited to, the signal to noise ratio of the channel, severity of multi-path, interference, noise, etc. Channel coherence time estimator 500 may also optionally employ the use of predictive models that may use statistical models and/or historical data to estimate how long TX1 and TX2 may operate without any changes in their current transmission characteristics.

After determining the channel coherence time, TX1 and/or TX2 may then determine how many packets may be transmitted without any adjustments in the transmission characteristics of TX1 or TX2, although the scope of the present invention is not limited in this respect. For example, if the characteristics of the channel are expected to remain relatively stable for a period of time, there may be no need to alter the operation of the transmitters of TX1 and TX2. Similarly, there may be no need to transmit channel side information during this period of time. Thus, TX1 and TX2 may transmit one or more packets (e.g. packets 403-406) that do not comprise channel side information.

In this particular embodiment, the absence of channel side information may improve the transmission throughput of data over the channel because packets 403-406 may comprise more bits of data than in packets 401 or 402. Alternatively, the size of the data 482 may remain the same, but more packets may be able to be transmitted within the coherence time since packets 403-406 do not include channel side information.

Continuing with the embodiment shown in FIG. 5, a channel side information manager 504 may determine what, if any, channel side information is to be transmitted with packets 401-408. For example, as shown in FIG. 4, TX1 may transmit a packet 401 that comprises a preamble 480, channel side information, and data 482. In this particular embodiment, the channel side information may comprise information indicating information associated with the channel coherence time. For example, the channel side information may include what the expected coherence time is, or alternatively, may indicate how many packets may be sent that do not include channel side information 481, although the scope of the present invention is not limited in this respect. Similarly, channel side information manager 504 may determine what channel side information 481 is to be included with packet 402.

After packets 401-402 have been transmitted, channel side information manager 504 may determine that no channel side information is to be sent with the transmission of subsequent packets 403-406. After the predicted channel coherence time has lapsed, TX1 and TX2 may once again monitor the characteristics of the channel and exchange channel side information 481 with packets 407-408, although the scope of the present invention is not limited in this respect. In alternative embodiments, channel side information may be included with a packet prior to the predicted end of the channel coherency time. In yet other embodiments, the number of packets to be transmitted without channel side information may stay the same or vary depending on the length of the channel coherence time. It should also be understood that the channel coherence time may not be the only consideration in determining how many packets are transmitted without channel side information. Alternatively or additionally, other factors such as relative priority of the data, quality of service, battery life, etc. may also be considered.

Figure 6:
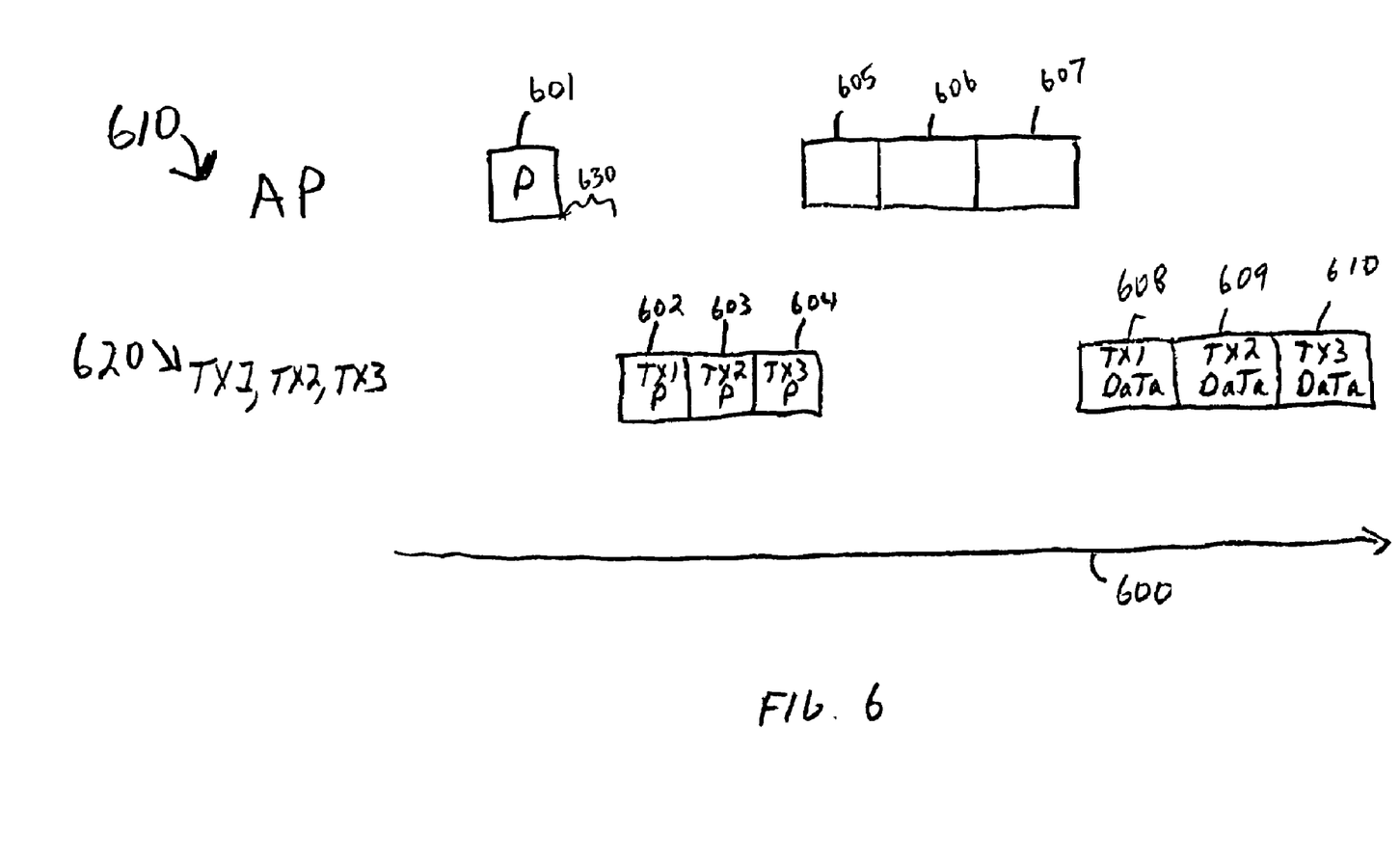
FIG. 6 is a simplified timing diagram suitable for use by terminals in a network in accordance with another embodiment of the present invention.

Turning to FIG. 6, yet another embodiment of the present invention is provided. FIG. 6 is a simplified timing diagram suitable for use by a point-to-multipoint communication system in accordance with an embodiment of the present invention. Timing diagram 610 illustrates transmissions from an access point (AP) to various terminals (TX1, TX2, TXn, etc) in a network. Timing diagram 620 illustrates the transmission from the terminals back to the access point.

As explained in more detail below, in this particular embodiment, the number of terminals that may transmit a packet of data within a frame or the channel coherence time may be dynamically altered depending on channel characteristics. For example, an access point may determine how long the access point may communicate with other terminals in the network without any changes in the operation of the respective transmitters. Given the amount of time that is available, the number of terminals, or the amount of data a terminal may transmit, may be varied to increase the amount of data that is transmitted while reducing the amount of channel side information that is exchanged.

Referring to FIG. 6, the access point may transmit a channel sounding preamble 601 that may be used by one or more WCDs (e.g. TX1, TX2, TX3) to measure the channel. After preamble 601 there may be a period of silence or dead time (indicated with a bracket 630) during with WCDs in the network may refrain from transmitting. During this time, the terminals, and perhaps the access point, may measure in-band interference and noise levels at their location during dead time 630. The terminals may use the in-band interference and channel measurements to select communication parameters including modulation orders, FEC codes and/or an interleaving scheme, for subsequent use by the access point.

Following dead time 630, the terminals (TX1-TX3) may sequentially transmit channel sounding preambles 602-604 to the access point. For example, in one embodiment, the WCDs may transmit its selected communication parameters prior to, as part of, or subsequent to the transmission of channel sounding preambles 602-604. Channel sounding preambles 602-604 may also comprise any of the channel estimate or channel side information described above. The access point may use the channel sounding preambles 602-604 to measure the upstream channel conditions, which may differ for each of the terminals.

The access point may then estimate or calculate the channel coherence time to predict how long before a change in transmission parameters may be needed. Once the channel coherence time is understood, the access point may dynamically adjust the number of terminals that may receive at least one packet within the upcoming transmission frame. Alternatively, the access point may determine how much data each of the terminals may transmit during the frame.

The access point may then transmit a packet of data 605-607 to the terminals. Packets 605-607 may comprise a variety of information such as, for example, the modulation order, FEC codes and/or interleaving selected by the access point for use by each of the terminals. Although FIG. 6 illustrates that the transmission of packets 605-607 may overlap with the transmission of packets 602-604, the scope of the present invention is not limited in this respect. In alternative embodiments, there may be a delay between packets 604 and 605.

Terminals TX1-TX3 may utilize the information received with packets 605-607 to determine if it may transmit data during this frame, initialize the transmission parameters to be used, and/or learn how much data they may be able to transmit. If permitted, terminal TX1 may then transmit it packet of data 608 using the appropriate parameters provided by the access point. Similarly, terminal TX2 and then terminal TX3 may transmit their data packets 609 and 610, respectively. It should be understood that although the example of FIG. 6 illustrates communication with three terminals, the scope of the present invention is not limited in this respect.

In alternative embodiments, the number of terminals that transmit preamble packets and the number of terminals that are able to transmit a data packet within the frame may be more or less and may dynamically vary depending on the transmission frame length. Further, the framing duration illustrated in FIG. 6 may be shorter than the coherence time of the channel so that the AP and the WCDs are able to adapt to the environmental dynamics of the channel.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of transmitting data across a channel in a wireless network, comprising:
    generating a first channel estimate and a second channel estimate for a channel;
    determining a channel coherency time by comparing the first and second channel estimates;
    transmitting a first packet comprising channel side information within the channel coherency time; and
    transmitting at least a second packet comprising data and that is devoid of channel side information prior to the end of the channel coherency time.

2. The method of claim 1, wherein transmitting the first packet includes transmitting a first packet further comprising data.

3. The method of claim 2, wherein transmitting the first packet includes transmitting a first packet further comprising a preamble.

4. The method of claim 1, wherein transmitting the first packet comprising channel side information includes transmitting a first packet comprising information selected from the group comprising: modulation order, delay time, forward error correction code, and channel estimate data.

5. A method comprising:
generating a first channel estimate and a second channel estimate for a channel;
determining a channel coherency time by comparing the first and second channel estimates; and
adjusting the number of data packets that are transmitted from a node in a wireless network, wherein the data packets are devoid of channel side information and transmitted within the channel coherency time, to effectuate efficient transmission of the data packets.

6. The method of claim 5, wherein adjusting the number of data packets is based, at least in part, on the channel coherency time.

7. The method of claim 5, further comprising transmitting a data packet comprising channel side information.

8. The method of claim 7, wherein transmitting the data packet comprising channel side information includes transmitting a data packet comprising a modulation order to be used by a transmitter in the wireless network.

9. The method of claim 7, wherein transmitting the data packet comprising channel side information includes transmitting a data packet comprising a delay time to be used by a transmitter in the wireless network.

10. The method of claim 7, wherein transmitting the data packet comprising channel side information includes transmitting a data packet comprising the first and/or second channel estimates to be used by a transmitter in the wireless network.

11. The method of claim 6, wherein adjusting the number of data packets includes selecting a number of data packets to be transmitted such that the data packets to be transmitted are transmitted without any substantial change in characteristics of a transmitter used to transmit the data packets.

12. A method of transmitting information, comprising:
generating a first channel estimate and a second channel estimate for a channel;
determining a channel coherency time by comparing the first and second channel estimates;
determining a transmission frame based on at least the channel coherency time; and
adjusting the number of terminals that may receive at least one packet within the transmission frame to effectuate efficient transmission of the at least one packet.

13. The method of claim 12, further comprising transmitting at least one packet comprising data from a first terminal and transmitting at least one packet comprising data from a second terminal.

14. The method of claim 13, further comprising transmitting an initialization packet prior to transmitting at least one packet comprising data from the first terminal.

15. The method of claim 14, wherein transmitting an initialization packet includes transmitting a packet comprising a preamble.

16. The method of claim 14, further comprising transmitting a packet comprising a preamble from the first terminal.

17. The method of claim 16, further comprising delaying for a period of time prior to transmitting a packet comprising a preamble from the first terminal.

18. The method of claim 14, further comprising transmitting a packet comprising channel side information from the first terminal.

19. The method of claim 18, further comprising transmitting a packet comprising channel side information from the second terminal.

20. The method of claim 19, wherein transmitting a packet comprising channel side information from the second terminal includes transmitting channel side information that is different than the channel side information transmitted from the first terminal.

21. The method of claim 12, further comprising:
transmitting a first packet comprising data from a first terminal to a second terminal; and
transmitting a second packet comprising data from the first terminal to a third terminal.

22. The method of claim 21, wherein the first packet and the second packet are transmitted within the transmission frame.

23. The method of claim 22, wherein generating the first and second channel estimates for the channel is based on a channel between the first terminal and the second terminal.

24. The method of claim 22, wherein generating the first and second channel estimates for the channel is based on a channel between the first terminal and the third terminal.

25. The method of claim 18, wherein transmitting the packet comprising channel side information includes transmitting a packet comprising a modulation order to be used by a transmitter transmitting at least one packet to the first terminal.

26. The method of claim 12, further comprising adjusting the amount of data that may be transmitted to the terminals within the transmission frame to effectuate efficient transmission of the data.

27. An article of manufacture comprising:
a computer-readable medium; and
a plurality of programming instructions stored on the computer-readable medium and designed to enable a device to:
generate a first channel estimate and a second channel estimate for a channel between a first terminal and a second terminal;
determine a channel coherency time of the channel by comparing the first and second channel estimates; and
adjust the number of packets devoid of channel side information that are to be transmitted from the first terminal to the second terminal within the channel coherency time to effectuate efficient transmission of the packets.

28. The article of manufacture of claim 27, wherein the programming instructions are further designed to enable a device to transmit a packet comprising channel side information from the first terminal to the second terminal within the channel coherency time.

29. The article of manufacture of claim 28, wherein the programming instructions are further designed to enable a device to, transmit a packet comprising the first and/or second channel estimates to be used by the first terminal when transmitting packets to the second terminal.

30. A wireless network comprising:
a terminal; and
an access point adapted to transmit packets to the terminal, wherein the access point is adapted to:
generate a first channel estimate and a second channel estimate for a channel;
determine a channel coherency time by comparing the first and second channel estimates; and
adjust the number of packets comprising data to be transmitted to the terminal, within the coherency time and before a packet comprising channel side information is transmitted to the terminal, to effectuate efficient transmission of the packets.

31. The wireless network of claim 30, wherein the access point is adapted to transmit a packet comprising channel side information including a modulation order to be used by the terminal.

32. The wireless network of claim 30, wherein the access point is adapted to transmit a packet comprising channel side information including a delay time to be used by the terminal.

33. An apparatus comprising:
a terminal adapted to transmit packets, wherein the terminal is adapted to:
generate a first channel estimate and a second channel estimate for a channel between the apparatus and a receiver;
determine a channel coherency time by comparing the first and second channel estimates; and
adjust the number of packets comprising data to be transmitted by the terminal, within the coherency time and before the terminal transmits a packet comprising channel side information, to effectuate efficient transmission of the packets.

34. The apparatus of claim 33, wherein the terminal is further adapted to transmit a packet comprising channel side information including a modulation order to be used by an access point.

35. The apparatus of claim 33, wherein the terminal is further adapted to transmit a packet comprising channel side information including a delay time to be used by the terminal.

* * * * *